(12) United States Patent
Notten et al.

(10) Patent No.: US 7,049,028 B2
(45) Date of Patent: May 23, 2006

(54) METHOD OF MANUFACTURING A LITHIUM BATTERY, A LITHIUM BATTERY AND AN ELECTRICAL APPLIANCE

(75) Inventors: Petrus Henricus Laurentius Notten, Eindhoven (NL); Petra Elisabeth De Jongh, Eindhoven (NL); Hans Feil, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 325 days.

(21) Appl. No.: 10/224,235

(22) Filed: Aug. 20, 2002

(65) Prior Publication Data

US 2003/0039883 A1 Feb. 27, 2003

(30) Foreign Application Priority Data

Aug. 24, 2001 (EP) ............................................. 01203185
Feb. 22, 2002 (EP) ............................................. 02075719

(51) Int. Cl.
*H01M 2/02* (2006.01)
*H01M 2/18* (2006.01)
*H01M 10/04* (2006.01)

(52) U.S. Cl. ........................ 429/163; 429/129; 429/246; 29/623.1; 29/623.4

(58) Field of Classification Search ................ 29/623.1, 29/623.4; 429/163, 176, 231.3, 231.8, 130, 429/246
See application file for complete search history.

(56) References Cited

U.S. PATENT DOCUMENTS

| | | | | |
|---|---|---|---|---|
| 5,958,088 A | * | 9/1999 | Vu et al. ..................... | 29/623.1 |
| 6,020,086 A | * | 2/2000 | Van Lerberghe ............. | 429/163 |
| 6,224,995 B1 | * | 5/2001 | Fauteux et al. ......... | 29/623.1 X |
| 2003/0017390 A1 | * | 1/2003 | Probst et al. ............... | 429/176 |

\* cited by examiner

*Primary Examiner*—Stephen J. Kalafut

(57) ABSTRACT

The invention relates to a method of manufacturing a lithium battery, which method includes the following steps: A) forming at least one anode and at least one cathode; B) forming at least one assembly that includes the anode, a separator layer and the cathode by positioning the separator layer between the anode and the cathode, and C) realizing an ultimate configuration for the assembly. The invention also relates to a lithium battery, which includes at least one lamination of at least one lithium cathode, and an anode that is connected to the lithium cathode via intermediate separator means. The invention also relates to an electrical appliance that includes such a lithium battery.

19 Claims, 3 Drawing Sheets

Figure 1:
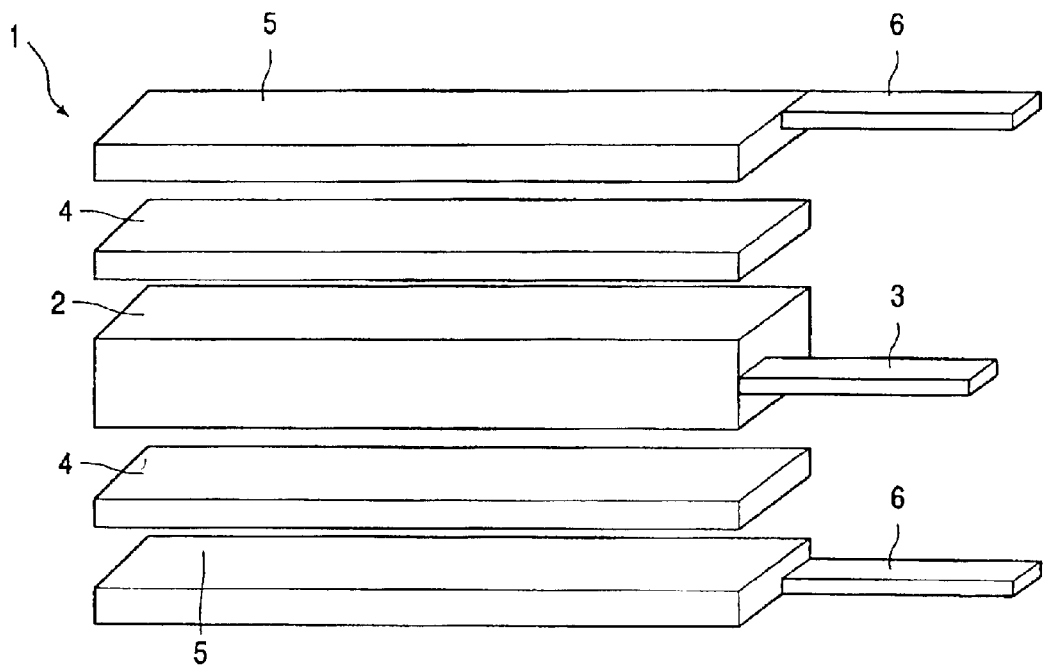

METHOD OF MANUFACTURING A LITHIUM BATTERY, A LITHIUM BATTERY AND AN ELECTRICAL APPLIANCE

The invention relates to a method of manufacturing a lithium battery, which method includes the following steps:
A) forming at least one anode and at least one cathode;
B) forming at least one battery stack that includes the anode, a separator layer and the cathode by positioning the separator layer between the anode and the cathode, and
C) realizing an ultimate configuration for the battery stack.
The invention also relates to a lithium battery, which includes at least one battery stack comprising a lithium cathode, an anode, and a separator layer. The invention also relates to an electrical appliance that includes such a lithium battery.

Conventional (rechargeable) lithium batteries have been commercially available for a decade already. Advantages of lithium batteries over conventional rechargeable batteries, such as the NiCd (nickel/cadmium) battery, consist in a high energy density per unit of volume and unit of weight. Moreover, such lithium batteries have a small format and a low weight so that they are ideal for use in portable electrical apparatus. It is a drawback of such lithium batteries that they are comparatively expensive in comparison with alternative energy sources that are more harmful to the environment. The most commonly used battery nowadays is the lithium ion (Li-ion) battery. Li-ion batteries contain a liquid electrolyte, which consists of, for example, polypropylene carbonate or ethylene carbonate with a solution of lithium salts. In order to prevent disintegration, the Li-ion battery should be kept under pressure continuously. From EP 0 969 541 and U.S. Pat. No. 5,478,668 it is known that a Li-ion battery can be kept under pressure by wrapping one or more laminates of electrodes and separator layers around one another so as to form a roll which is subsequently accommodated under pressure in a steel, round standard housing such as the 18650 format. The liquid electrolyte can be added, after which the contents of the standard housing are hermetically sealed from the environment. It is a major drawback of the Li-ion battery that the freedom as regards the choice of a desirable shape and/or format is extremely limited, because the geometry of such a battery is dependent on the standard housing so as to create and preserve a continuous pressure.

Some years ago this drawback was obviated by replacing the liquid electrolyte by electrodes comprising a different electrolyte and a polymer matrix. Such lithium polymer batteries offer the advantage that the presence of the polymer matrix gives rise to an essential, structural integrity in the battery so that the need for external pressure diminishes. Consequently, the freedom as regards the choice of the shape and/or format of a lithium polymer battery is no longer limited to a steel, round standard housing; large, flat, rectangular lithium batteries can now be produced instead. However, the shape of the lithium batteries nevertheless remains limited to a rectangular and flat geometry. For many apparatus to be powered it is not very practical to use a lithium polymer battery having a rectangular, flat geometry. From prior art there is also known a method for the manufacture of lithium batteries while utilizing the so-called "Lithylene technology". According to this technology a negative electrode, a separator and a positive electrode are stacked. The positive electrode and the negative electrode are provided with cavities that may be filled with a polymer material, which, after curing, binds the active material layers of the electrodes together. In accordance with this technology the active material layers themselves are not embedded in a polymer, but the polymer is used exclusively for binding material layers together. From prior art it is also known that Ultra High Molecular Weight Polymers (UHMWP) can be used to manufacture self-supporting electrodes. An advantage of the use of such polymers resides in the fact that electrodes having a comparatively high capacitance can be manufactured while using a comparatively small quantity of polymer.

It is an object of the present invention to provide a method of manufacturing an improved lithium battery of the kind set forth which enables the formation and use of a lithium battery that has a curved, plane geometry while preserving the advantages of the prior art and without incurring the described drawbacks.

To this end, a method of the kind set forth in accordance with the invention is characterized in that the battery stack is subjected to a deformation treatment during which it is deformed in such a manner that in the ultimate configuration in conformity with the step C) the battery stack exhibits a curved, plane geometry.

The curved plane geometry offers the advantage that any desired shape of a lithium battery can be realized so that the freedom of choice as regards shape and format of the lithium battery is many times greater than the freedom offered by the state of the art. The geometry of a lithium battery can thus be adapted to spatial limitations imposed by any electrical apparatus in which the battery can be used. From a point of view of space, in many cases electrical apparatus can now be more efficiently configured because of the greater freedom as regards the choice of the geometry of a lithium battery; this may lead to a saving of space in the apparatus.

It is to be noted that the curved plane geometry results in a curved battery which has a curved flat shape which may be concave/convex or wavy. The methods can utilize a plurality of already known technologies, such as technologies for manufacturing a lithium polymer battery, for manufacturing the so-called self-supporting electrodes by addition of Ultra High Molecular Weight Polymers (UHMWP), and the already mentioned "lithylene technology". Combinations of different technologies may also be used. Electrodes forming part of the anode and the cathode and the separator layer in one embodiment are manufactured in conformity with U.S. Pat. No. 5,478,668. The electrodes and the separator in another preferred embodiment contain only UHMWP. The electrodes in another preferred embodiment yet are manufactured in conformity with U.S. Pat. No. 5,478,668 and the separator layer contains polyethylene. In another embodiment the electrodes are made of UHMWP and the separator contains polyethylene with a binder. Optionally a UHMWP is also used as a separator in the latter preferred embodiment, the polyethylene layer serving merely as protection against overheating.

Preferably, in the deformation treatment, use is made of means that are pre-shaped and correspond to the desired curved, plane geometry of the lithium battery.

In an advantageous embodiment of the invention, said means comprise a supporting structure.

When such supporting structure is applied, a stack of anodes, cathodes and separators is placed on said supporting structure that has a curved plane geometry. The stack may be hold on the structure by adhesive tape or glue. Subsequently the stack, including the curved structure, is put in a so-called softpack, activated with electrolyte and the softpack is evacuated. The atmospheric pressure on the stack will cause sufficient stack pressure to maintain low impedance and good cycle life. The supporting structure is as thin as possible and can be made of materials that are inert in the battery electrolyte such as polyethylene and polypropylene.

In order to facilitate manufacturing of the battery, the supporting structure may advantageously comprise clamping means.

The curvature of the stack is then additionally maintained by physical clamping of the layers prior to packaging.

The method according to the present invention is advantageously characterized in that, subsequent to the formation of the battery stack in the step B), polymer is deposited in cavities formed in the anode and the cathode in order to stick the assembly together.

Such method is also referred to as the Lithylene™ technology.

In a preferred embodiment of the latter method, at least one of the outer sides of the battery stack is provided with a polymer layer and in a pre-shaped supporting structure is present between the battery stack and the polymer layer.

In practice this results in the use of the Lithylene™ technology where an additional layer is included between the inner rivet polymer layer and the battery stack. The layer is as thin as possible and can be made of materials that are inert in the battery electrolyte such as polyethylene and polypropylene. The purpose of the layer is to prevent the loss of stack pressure. For that reason the layer must have resistance against bending. The Polymer rivets used in the Lithylene™ technology maintain the stack pressure between the additional layer and the upper outside layers. With this preferred method, stack pressure is maintained even without maintaining vacuum in the softpack.

In particular, the battery stack forms a lamination that is cured in step C).

The lamination is cured by means of known curing techniques, such as extraction, gluing, UV exposure or other chemical processes, which ensure that a polymer matrix that forms part of the lithium battery is cured, so that the lithium battery loses its flexibility and ultimately obtains its final shape.

In another preferred version of the present method the curing takes place under pressure. The predetermined geometry can be accurately checked by performing the curing operation under pressure, so that irregularities and other inaccuracies in or on the lamination can be counteracted.

In an embodiment of the method according to the invention, the elements that form part of the lamination are curved separately. In another preferred version the lamination as a whole is curved prior to the execution of the step C). This can be performed by arranging the assembled lamination in a mold under pressure. The mold greatly contributes to the control of the geometry of the lithium battery during the curing process, so that an accurately defined geometry can be achieved.

In another preferred version the step C) is executed at a temperature in the range of from 140 to 160° C., preferably at 150° C. At such temperatures, the polymers forming part of the cathode, the anode and the separator become fluid such that they melt together. As a result of the melting together of the polymers, the cathode, the anode and the separator stick together. After sufficient cooling off of the lithium battery and thus the polymers, the polymers are cured such that the lithium battery acquires its final configuration. By heating the laminate to a temperature of 150° C. in a first phase and sufficiently cooling off the laminate in a second phase, the laminate can be cured in the desired shape but without inducing a significant loss of mechanical and/or chemical properties.

In a preferred version a plurality of laminations are arranged essentially parallel against one another prior to the execution of the step C). Consequently, the capacitance of the lithium battery will be increased relative to a lithium battery composed of a single lamination. Because of the presence of a plurality of laminations, the lithium battery will thus be capable of delivering more power and of delivering for a longer period of time in comparison with a lithium battery comprising a single lamination. In the foregoing it was assumed that the capacitance and geometry of the single lamination correspond to the properties of the individual laminations of a multiple lamination. In addition it is feasible to use a multiple lamination that is thicker and smaller than a single lamination, thus enabling a lithium battery of a given desired minimum capacitance to be accommodated within the geometrical limitations of an electrical apparatus.

The invention also provides a lithium battery of the kind set forth which is characterized in that the battery stack exhibits a curved plane geometry and is obtainable by means of the method according to the present invention.

The lithium battery is thus situated in a curved (three-dimensional) plane. Within one lamination layer the anode is preferably positioned between two lithium cathodes (with an intermediate separator layer). Preferably, a plurality of laminations is stacked, with or without inserting an intermediate separator layer.

Moreover, the lithium cathode preferably comprises $Li_xCoO_2$. In another preferred embodiment the lithium cathode contains a polymer, preferably PvdF (polyvinylidene fluoride) or PEO (polyethylene oxide). In another preferred embodiment yet the lithium cathode contains electron-conducting graphite in order to achieve suitable electrical conductivity in the lithium cathode. The lithium cathode in another preferred embodiment includes an aluminum collector.

The anode preferably contains graphite. Graphite in a preferred embodiment is fixed on a polymer matrix. The anode in another preferred embodiment comprises a copper collector.

The separator means of the lithium battery preferably consist of a polymer, for example polypropylene or polyethylene, in order to prevent electrical short-circuiting. The separator means in a preferred embodiment are wetted with an electrolyte. The electrolyte preferably includes a conductive polymer matrix. The conductive polymer matrix itself may be conductive. If it is not conductive, the polymer matrix may be arranged, for example, such that it contains a liquid containing lithium.

The invention also relates to an electrical appliance which includes a lithium battery, at least a part of the lithium battery forming at least a part of a component of the electrical appliance. When at least a part of the electrical appliance is formed by a lithium battery, a substantial saving of space can be realized in the electrical appliance, thus enabling the electrical appliance to have a more compact construction. Electrical appliances are preferably portable, for example shavers, tooth brushes, portable cassette and/or compact disc players. Preferably, at least the lithium battery forms a part of the housing. Because the lithium batteries may have a plurality of configurations, the geometry of the domestic apparatus need not be adapted or only hardly so.

Embodiment

Preparation of Positive Electrode

Eighty-seven parts by weight of $LiCoO_2$, eight parts by weight of graphite powder, and five parts of polyvinylidene fluoride were dispersed in N-methylpyrrolidone (hereinafter abbreviated as NMP) to prepare positive electrode active material paste. The paste was applied with a doctor blade to a coating thickness of 300 μm to form a positive electrode active material film. A 30 μm thick aluminum net as a positive electrode current collector was placed thereon, and the positive electrode active material paste was again spread on the net with a doctor blade to a thickness of 300 μm. The double-coated aluminum net was allowed to stand in a drier kept at 60° C. for 60 minutes to make the paste half-dried. The resultant lamination, composed of the positive electrode current collector and the positive electrode active material, was rolled to a thickness of 400 μm to prepare a positive electrode having positive electrode active material layers. The positive electrode was immersed in an electrolytic solution. The peel strength between the positive active material layer and the positive electrode current collector measured after the immersion was found to be from 20 to 25 gf/cm.

Preparation of Negative Electrode

Ninety-five parts by weight of Mesophase Microbead Carbon (a trade name, produced by Osaka Gas Co., Ltd.) and five parts by weight of polyvinylidene fluoride were dispersed in NMP to prepare negative electrode active material paste. The paste was applied with a doctor blade to a thickness of 300 μm to make a negative electrode active material film A 20 μm thick copper net of band form as a negative electrode current collector was placed thereon, and the negative electrode active material paste was again spread thereon with a doctor blade to a thickness of 300 μm. The lamination was allowed to stand in a drier at 60° C. for 60 minutes to make the paste half-dried. The resultant lamination, composed of the negative electrode current collector and the negative electrode active material, was rolled to a thickness of 400 μm to prepare a negative electrode having negative electrode active material layers.

The negative electrode was immersed in an electrolytic solution. The peel strength between the negative electrode active material layer and the negative electrode current collector measured after the immersion was found to be from 5 to 10 gf/cm.

Preparation of Battery

Five parts by weight of polyvinylidene fluoride and ninety-five parts by weight of NMP were mixed and thoroughly stirred to prepare a uniform binder resin solution.

The binder resin solution thus prepared was dropped on a side each of two porous polypropylene sheets (Cellguard #2400, produced by Hoechst) of continuous band form used as a pair of separators and uniformly spread over the entire surface of the separators by rolling with a bar coater having a filament of 0.5 mm in diameter wound tightly around a glass tube of 1 cm in diameter.

Before the binder resin dried, the positive electrode as one of electrodes was sandwiched in between the coated sides of the separators in intimate contact, and the lamination was deformed in a desired configuration in a mold, for example, and subsequently dried by heating while applying pressure from both sides with a pressure roller etc. and cut to pieces of a given length. The binder resin solution was applied to one side of a cut piece of the paired polypropylene sheets with a bar coater in the same manner as described above, and the negative electrode cut to a prescribed size as the other electrode was stuck thereto. The binder resin solution was then applied to a side of another cut piece of the paired polypropylene sheets having the positive electrode therebetween and the coated side was stuck to the negative electrode of the lamination. These steps were repeated to build up a laminated body having a plurality of laminations. The laminated body was heated in still air at 60° C. in a drier while applying pressure to evaporate NMP solvent to prepare a pre-shaped laminated battery body. On NMPs evaporating, the binder resin became a porous film with open cells.

The above combinations and composites are non-limitative. A person skilled in the art will surely be capable of conceiving many alternatives for the above combinations and composites.

The invention will be described in detail hereinafter with reference to the nonlimitative embodiments that are shown in the Figures.

Figure 2:
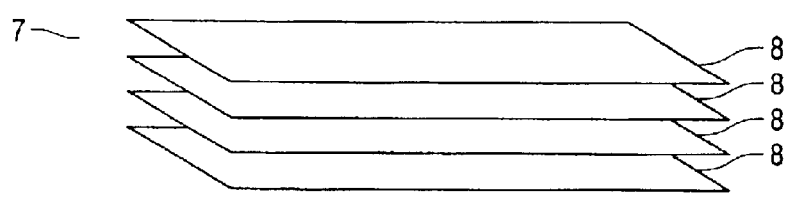
Figure 6:
Figure 3:
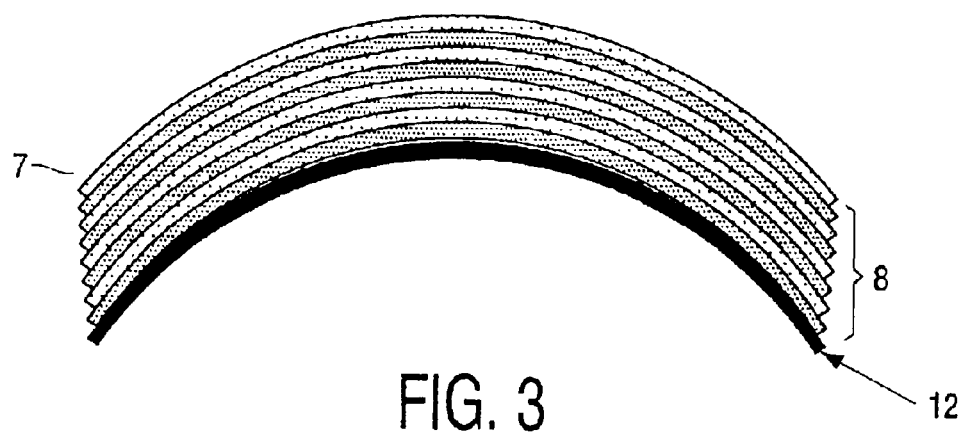
Figure 4:
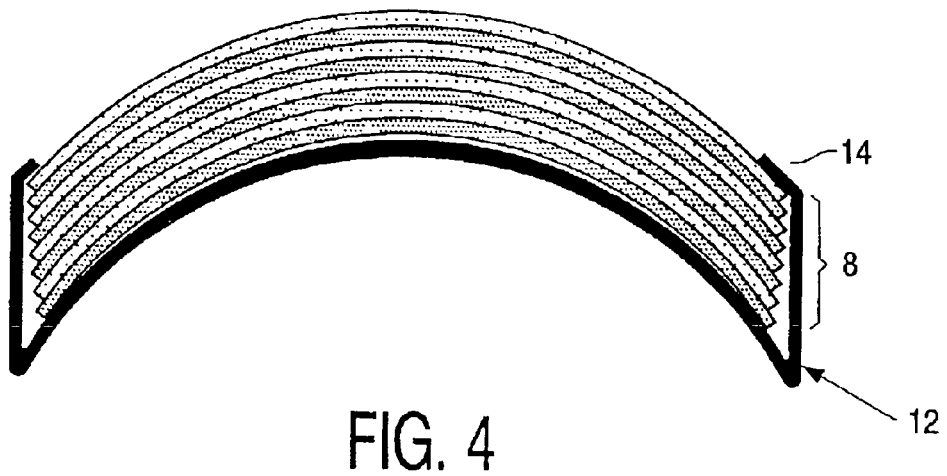
Figure 5:
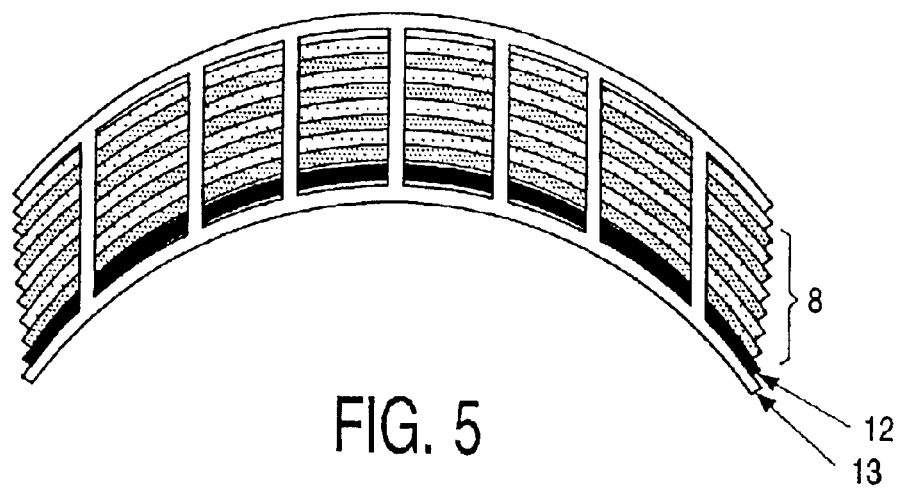
Figure 7:
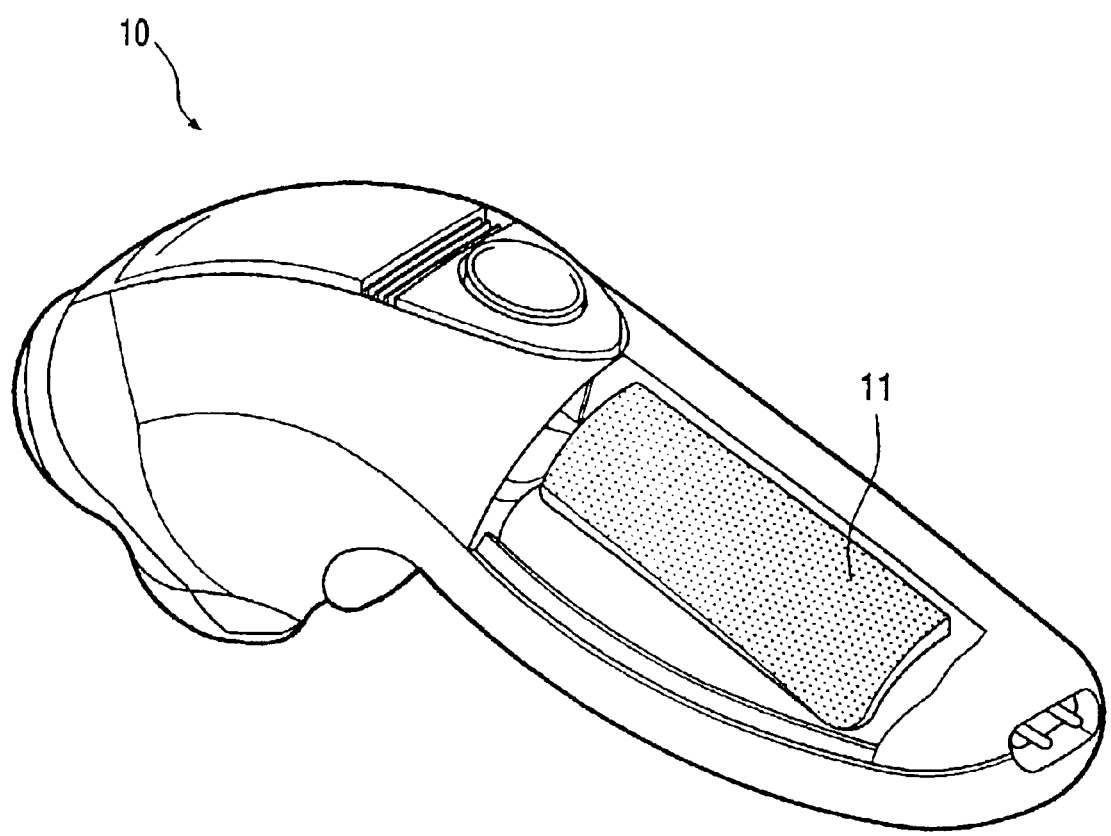

FIG. 1 is a diagrammatic side elevation of a lamination (not yet curved) in a non-assembled state, FIG. 2 is a perspective view of a lithium polymer battery in conformity with the state of the art in a non-assembled state, FIG. 3 is a schematic view of a battery stack with a supporting structure, FIG. 4 is a schematic view of a battery stack with a supporting structure, which supporting structure is provided with clamping means, FIG. 5 is a schematic view of a lithium battery manufactured according to the Lithylene™ technology and provided with a supporting structure, FIG. 6 is a perspective and overall view of the enclosure of a lithium polymer battery in accordance with the invention, and FIG. 7 is a perspective view of a shaver provided with a lithium battery in accordance with the invention.

FIG. 1 is a diagrammatic side elevation of a lamination 1 in accordance with the invention that has not (yet) been curved. The lamination 1 is provided with a graphite anode 2, which is connected, to a copper collector 3. Two lithium cathodes 5 are provided on two sides while using an intermediate separator layer 4. The lithium cathode 5 preferably contains $LiCoO_2$ and is connected to an aluminum collector 6. The separator layer 4 preferably contains a polymer, for example polypropylene or polyethylene. The layers shown are stacked during the manufacture of a lithium battery. In addition to the single lamination 1, multiple laminations can also be stacked during the manufacture of a lithium battery.

FIG. 2 is a perspective view of a lithium polymer battery 7 according to the present state of the art. The lithium polymer battery 7 is provided with a plurality of stacked laminations 8 that together constitute a basis for the battery 7. The plane, rectangular shape of the laminations 8 is clearly shown in FIG. 2. A lithium polymer battery 7 in accordance with the state of the art has a limitation in that it can be less readily fitted in an electrical apparatus.

FIG. 3 shows a schematic view of a plurality of battery stacks 8 with a supporting structure 12. When such supporting structure 12 is applied, a stack of anodes, cathodes and separators is placed on said supporting structure that has a curved plane geometry. The stack may be hold on the structure by adhesive tape or glue. Subsequently the stack, including the curved structure, is put in a so-called softpack, activated with electrolyte and the softpack is evacuated. The atmospheric pressure on the stack will cause sufficient stack pressure to maintain low impedance and good cycle life. The supporting structure 12 is as thin as possible and can be made of materials that are inert in the battery electrolyte such as polyethylene and polypropylene. As shown in FIG. 4, the supporting structure 12 can also be provided with clamping means 14 that provide for an additional physical clamping of the layers.

FIG. 5 is a schematic view of a lithium battery manufactured according to the Lithylene™ technology and provided with a supporting structure. As shown in the figure, a polymer 13 acts as a rivet in order to keep the layers active material together. The supporting structure 12 is included between the inner rivet polymer layer 13 and the battery stack. The purpose of the supporting structure is to prevent the loss of stack pressure. For that reason the layer must have resistance against bending. The Polymer rivets used in the Lithylene™ technology maintain the stack pressure between the additional layer and the upper outside layers. With this preferred method, stack pressure is maintained even without maintaining vacuum in the softpack.

FIG. 6 is a perspective view of a lithium polymer battery 9 in accordance with the invention. The lithium polymer battery 9 is composed of one or more laminations. Each lamination is composed in conformity with one of the claims 9 to 22. FIG. 6 clearly shows that the lithium polymer battery 9 has an (arbitrarily chosen) curved, plane shape.

FIG. 7 is a perspective view of a shaver 10, which is provided with a lithium battery 11 in accordance with the invention. The lithium battery 11 has a curved shape such that it can be optimally accommodated in the housing of the shaver 10. The geometry of a lithium battery 11 can be chosen in conformity with the requirements imposed by an electrical device, for example the shaver 10, in such a manner that the space available in the electrical apparatus can be used to receive the battery 11.

What is claimed is:

1. A method of manufacturing a lithium battery, comprising the acts of:
    A) forming at least one anode and at least one cathode,
    B) forming at least one battery stack that includes the anode, a separator layer and the cathode by positioning the separator layer between the anode and the cathode, and
    C) realizing an ultimate configuration for the battery stack by subjecting the battery stack to a deformation treatment during which the battery stack is deformed in such a manner that in the ultimate configuration in conformity with the step C) the battery stack exhibits a curved, plane geometry, wherein subsequent to the formation of the battery stack in step B), a polymer is deposited in cavities formed in the anode and the cathode.

2. A method as claimed in claim 1, characterized in that in the deformation treatment, use is made of means that are pre-shaped and correspond to the desired curved, plane geometry of the lithium battery.

3. A method as claimed in claim 2, characterized in that the means comprise a supporting structure.

4. A method as claimed in claim 3, characterized in that the supporting structure comprises clamping means.

5. A method as claimed in claim 2, characterized in that the means comprise a mould.

6. A method according to claim 1, characterized in that at least one of the outer sides of the battery stack is provided with a polymer layer, and in that a pre-shaped supporting structure is present between the battery stack and the polymer layer.

7. A method as claimed in claim 1, characterized in that the battery stack forms a lamination which is cured in step C).

8. A method as claimed in claim 7, characterized in that the curing is performed under pressure.

9. A method as claimed in claim 7, characterized in that the lamination is curved in the assembled condition by arranging the lamination in a mold while applying pressure.

10. A method as claimed in claim 1, characterized in that the step C) is carried out at a temperature in the range of from 140 to 160° C., preferably at 150° C.

11. A method as claimed in claim 1, characterized in that a plurality of laminations are arranged so as to extend mainly parallel to one another prior to the execution of the step C).

12. A lithium battery which includes at least one battery stack comprising a lithium cathode, an anode and a separator layer, characterized in that the battery stack exhibits a curved plane geometry and is obtainable by means of the method according to claim 1.

13. A lithium battery as claimed in claim 12, characterized in that the lithium cathode contains $LiCoO_2$.

14. A lithium battery as claimed in claim 12, characterized in that the anode contains graphite.

15. An electrical appliance which includes a lithium battery as claimed in claim 12, characterized in that at least a part of the lithium battery constitutes at least a part of a component that forms part of the electrical appliance.

16. An electrical appliance as claimed in claim 15, characterized in that the lithium battery forms at least a part of a housing of the domestic appliance.

17. A method of manufacturing a lithium battery, comprising the acts of:
    A) forming at least one anode and at least one cathode,
    B) forming at least one battery stack that includes the anode, a separator layer and the cathode by positioning the separator layer between the anode and the cathode, and
    C) realizing an ultimate configuration for the battery stack by subjecting the battery stack to a deformation treatment during which the battery stack is deformed in such a manner that in the ultimate configuration in conformity with the step C) the battery stack exhibits a curved, plane geometry, wherein subsequent to the formation of the battery stack in step B), an adhesive polymer is deposited in cavities formed in the anode and the cathode.

18. A method of manufacturing a lithium battery, comprising the acts of:
    A) forming at least one anode and at least one cathode,
    B) forming at least one battery stack that includes the anode, a separator layer and the cathode by positioning the separator layer between the anode and the cathode, and
    C) realizing an ultimate configuration for the battery stack by subjecting the battery stack to a deformation treatment during which the battery stack is deformed in such a manner that in the ultimate configuration in conformity with the step C) the battery stack exhibits a curved, plane geometry, wherein the battery stack forms a lamination which is cured in step C).

19. A method as claimed in claim 18, characterized in that the curing is performed under pressure.

* * * * *